US009668044B2

(12) United States Patent
Schobel et al.

(10) Patent No.: US 9,668,044 B2
(45) Date of Patent: May 30, 2017

(54) MANAGING CONNECTIONS OF A USER DEVICE

(71) Applicant: APPLE INC., Cupertino, CA (US)

(72) Inventors: Andreas E. Schobel, San Francisco, CA (US); Nathan de Vries, San Francisco, CA (US); Gregory B. Novick, San Francisco, CA (US); Anthony J. Guetta, San Carlos, CA (US); Jason C. Conn, San Francisco, CA (US); Augustin Prats, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/362,629

(22) Filed: Nov. 28, 2016

(65) Prior Publication Data

US 2017/0078786 A1 Mar. 16, 2017

Related U.S. Application Data

(63) Continuation of application No. 14/475,422, filed on Sep. 2, 2014, now Pat. No. 9,510,083.

(Continued)

(51) Int. Cl.

*H04B 3/00* (2006.01)
*H04R 1/10* (2006.01)

(Continued)

(52) U.S. Cl.

CPC ....... *H04R 1/1091* (2013.01); *H04L 65/1069* (2013.01); *H04W 76/02* (2013.01); *H04R 2420/07* (2013.01)

(58) Field of Classification Search

CPC .............. H04R 27/00; H04R 2227/005; H04R 1/1091; H04R 2499/15; H04R 2420/07;

(Continued)

(56) References Cited

U.S. PATENT DOCUMENTS 5,680,549 A 10/1997 Raynak et al.
8,892,088 B2 11/2014 Wang et al.

(Continued)

FOREIGN PATENT DOCUMENTS

WO 2011/137638 A1 11/2011

OTHER PUBLICATIONS

International Preliminary Report on Patentability mailed on Dec. 15, 2016 in International Application No. PCT/US2015/022839. 12 pages.

(Continued)

*Primary Examiner* — Thang Tran
(74) *Attorney, Agent, or Firm* — Kilpatrick Townsend & Stockton

(57) ABSTRACT

Systems, methods, and computer-readable medium are provided for managing connections of user devices. For example, two source devices may be configured to maintain a data stream with one another. The data stream may enable the two source devices to identify one or more connections between each other and at least a third device. In response to receiving an event that indicates content to be provided to the third device, the data stream may be used by the source devices to configure their network connections with the third device.

20 Claims, 6 Drawing Sheets

Related U.S. Application Data

(60) Provisional application No. 62/005,505, filed on May 30, 2014.

(51) Int. Cl.
*H04W 76/02* (2009.01)
*H04L 29/06* (2006.01)

(58) Field of Classification Search
CPC ..... G06F 13/385; G06F 3/165; H04N 21/439; H04N 2201/0036; H04N 2201/0072; H04W 76/00; H04W 76/02; H04W 88/06; H04L 65/1069
See application file for complete search history.

(56) References Cited

U.S. PATENT DOCUMENTS

2003/0212804 A1 11/2003 Hashemi
2006/0187860 A1 8/2006 Li
2007/0234048 A1 10/2007 Ziv
2009/0094360 A1 4/2009 Moorer
2009/0150553 A1* 6/2009 Collart ............. G06F 17/30017 709/229
2009/0228897 A1* 9/2009 Murray .................. G06F 9/544 719/313
2011/0126241 A1* 5/2011 Beattie, Jr. ....... H04N 21/23439 725/62
2012/0263318 A1* 10/2012 Millington .............. H04R 3/00 381/107
2014/0270201 A1 9/2014 Kocalar et al.
2015/0148928 A1 5/2015 Malsbary
2016/0112744 A1* 4/2016 Kusano .................. G06F 3/165 725/81
2017/0013307 A1* 1/2017 Kim .................. H04N 21/4325

OTHER PUBLICATIONS

International Search Report and Written Opinion of the International Searching Authority mailed on Aug. 20, 2015 for International Application No. PCT/US2015/022839, 17 pages.
Non-Final Office Action mailed on Feb. 16, 2016 in U.S. Appl. No. 14/475,422, 12 pages.
Notice of Allowance mailed on Aug. 3, 2016 in U.S. Appl. No. 14/475,422, 9 pages.
Invitation to pay additional fees and, where applicable, protest fee mailed on Jun. 10, 2015 in International Publication No. PCT/US2015/022839. 6 pages.

* cited by examiner

MANAGING CONNECTIONS OF A USER DEVICE

CROSS-REFERENCES TO RELATED APPLICATIONS

The present application claims priority to U.S. application Ser. No. 14/475,422, filed Sep. 2, 2014, which claims the benefit of U.S. Provisional Application No. 62/005,505, filed May 30, 2014, which are hereby incorporated by reference for all purposes. The present application is also related to U.S. Provisional Application Nos. 62/005,550, 62/005,534, 62/005,606, 62/005,325, 62/005,336, 62/005,563, 62/005,586, 62/005,715 and 62/005,799, all filed May 30, 2014, which are commonly owned and are hereby incorporated by reference for all purposes. The present application is also related to U.S. Provisional Application No. 61/953,591 filed Mar. 14, 2014 which is hereby incorporated by reference for all purposes.

BACKGROUND

Network-accessible user devices have become ubiquitous over the years, with many different manufacturers providing a plethora of different types, styles, and models. For example, different types of such user devices may include audio players, headsets, or the like. Additionally, some of these user devices are configured with only one or sometimes only a few functionalities. Further, with the number of variations in type and the recent changes in technology, some of these user devices may be able to connect to multiple source devices, while others may only be able to connect to a single source device. In some examples, the source device may be configured to provide content for presentation by the user device. As such, managing such user devices may pose challenges for developers of source and user devices.

BRIEF SUMMARY

Embodiments of the present disclosure can provide systems, methods, and computer-readable medium for managing connections of a user device by one or more source devices. Two source devices may be configured to establish and/or maintain a data stream for communicating with one another about the connections of the user device. Once established, the two source devices may instruct each other how to handle individual network connections with the user device. For example, one of the source devices may use the data stream to inform the other source device about its own network connections with the user device. Requests to connect the second source device to the user device may also be shared with the first source device using the data stream.

According to one embodiment, a method may be executed by one of the two source devices to establish a network connection with the user device. Using that established connection, the first device may provide content (e.g., audio content) to the user device. When an input is received (e.g., at the second source device) that indicates additional content for the second source to provide to the user device, the second source device may provide configuration instructions to the first source device. The configuration instructions may indicate to the first source device information about configuring the network connection between the first source and the user device. The second source may then establish a connection with the user device and provide content to the user device (e.g., once the first connection has been terminated by the first source).

According to another embodiment, a system may be implemented as a first computing device (e.g., one of the source devices) configured to maintain a data stream with the other source device. The first source may also be configured to establish a first network connection with a third device (e.g., the user device). The user device may be configured to present information (e.g., electronic content) to a user. In some aspects, the first source may provide information to the user device using the first network connection. Upon receipt of instructions for configuring the first network connection, the second computing device may be enabled to establish a different network connection with the user device once the first network connection ends.

According to another embodiment, a computer-readable medium may include instructions that, when executed, configure a computer processor of a first computing device to maintain a data stream with a second computing device. In some cases, the first computing device may also identify a network connection between the second computing device and a user device. This identification may take place via the data stream, where the second device may provide information that identifies the network connection to the first device. An event may be received by the first device that identifies content to be transmitted to the user device. The content may be requested to be transmitted by the first device. Additionally, using the data stream, instructions to configure the first network connection may be provided to the second device. At least in response to the event, another network connection (e.g., between the first device and the user device) may be utilized to provide the content to the user device from the first device.

DETAILED DESCRIPTION

Figure 1:
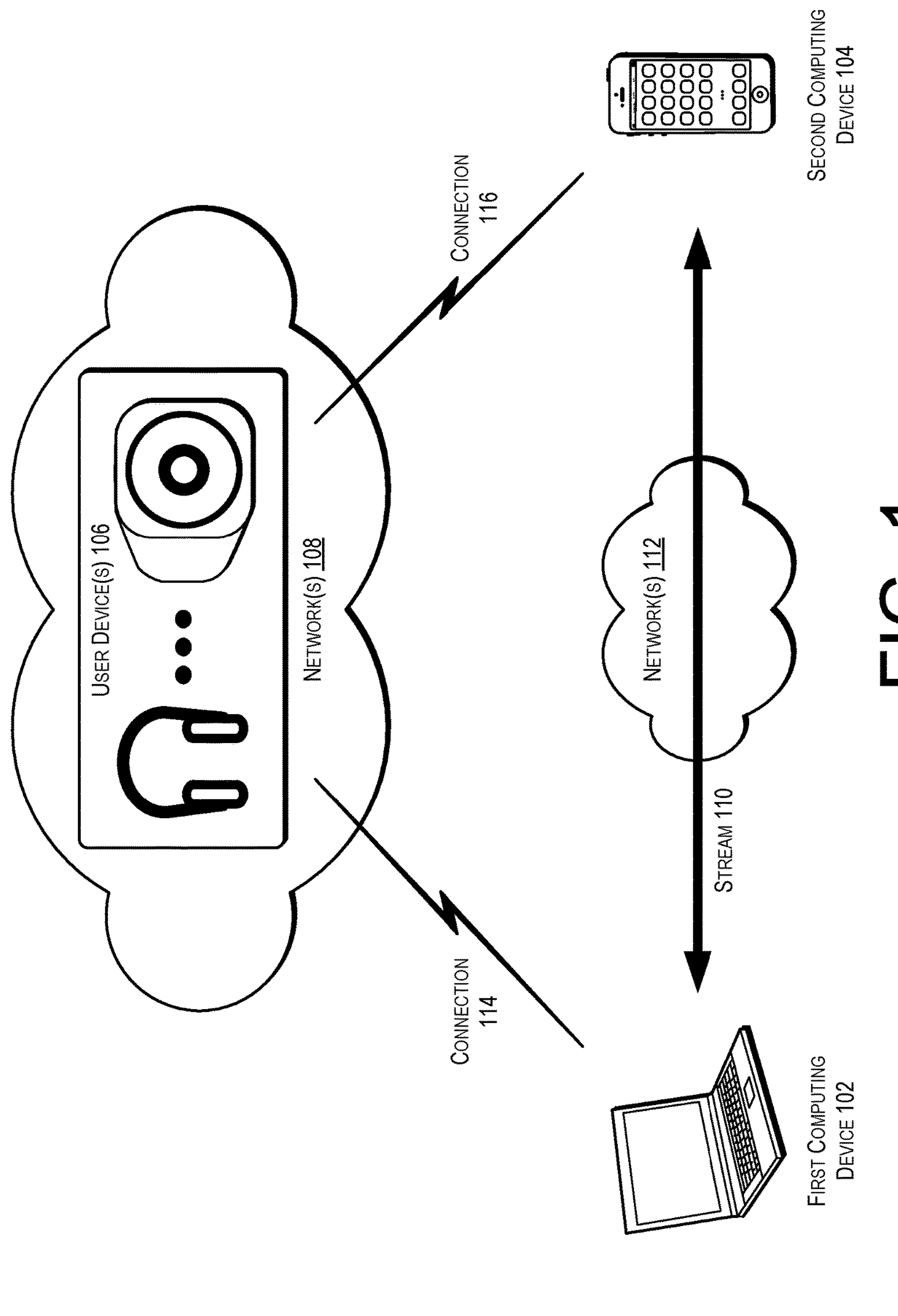
FIG. 1 is a simplified block diagram illustrating an example architecture for managing connections of a user device as described herein, according to at least one example.

Examples of the present disclosure are directed to, among other things, managing connections of a user device by one or more source devices. In some examples, two source devices may be configured to establish and/or maintain a data stream for communicating with one another about the connections of the user device. Once established, the two source devices may instruct each other how to handle individual network connections with the user device. For example, one of the source devices may use the data stream to inform the other source device about its own network connections with the user device. Requests to connect the second source device to the user device may also be shared with the first source device using the data stream.

In some cases, connections of mobile peripheral devices (also referred to herein as "user devices") may be managed by the two source devices. In some examples, the user devices may be network-accessible devices such as, but not limited to, wireless headsets (e.g., headphones and/or a microphone), wireless audio playback devices (e.g., streaming media players, Moving Picture Experts Group (MPEG)-1 or MPEG-2 Audio Layer III (MP3) players, or the like), wireless file transfer devices, or other similar types of devices configured to receive and/or provide data over a network connection. In some cases, such user devices may communicate with the one or more source devices (e.g., a laptop, a telephone, a tablet, etc.) using various types of wireless communication protocols or standards including, but not limited to, Bluetooth, Bluetooth low energy (BTLE), ZigBee, Near field Communication (NFC), or the like.

A device may be considered a source device because one of its functions, when paired with the user device, is to provide content for the user device to present to a user. However, in some cases, the source device may also receive data from the user device. For example, when the user device is a mobile headset, the source device (e.g., a mobile telephone) may send audio (e.g., the voice of a caller) to the user device and also receive audio (e.g., the voice of the user) from the user device. Still, in the example where the user device is a set of mobile headphones, the user device may only receive audio (e.g., music, etc.) from the source device. But, it is possible, even in this scenario, for the user device to provide data back to the source device (e.g., volume control information, audio position control information, playback speed control information, or the like). In addition, even if the user device does not have a subscriber identity module (SIM) card or a baseband processor (BP), it may still be able to simulate such network interface devices. For example, the user device may emulate a BP and/or a SIM card to generate a ring that will appear to other devices as an outgoing call from the user device. The emulation may be provided by the Bluetooth stack of the user device.

Some user devices may be configured to establish network connections with a plurality of source devices. However, other user devices may be configured to only establish network connections with a single source device. Still, even when multiple network connections are enabled, the user device may be limited to the number of simultaneous connections. In other words, a user device may have the capability to establish multiple connections, but may be limited to the number of those connections that it can manage at the same time. Alternatively, some user devices may be able to manage a plurality of network connections with multiple different source devices. While the following disclosure may focus mostly on user devices that can only manage or otherwise establish a single network connection at a time, it should be understood that the same or similar techniques may be used to manage network connections of user devices that can handle multiple different network connections (either concurrently or consecutively). Thus, the following techniques are not intended to, and do not, limit the applicability of similar techniques with more advanced user devices.

I. Two Source Devices

In at least one example, two source devices (e.g., a laptop and a mobile phone) may communicate with one another to aid in the management of network connections for the user device (e.g., as a shared resource of the two source devices). For the purposes of explanation, the user device in this scenario may be a Bluetooth headset configured to play audio files of the laptop and/or the mobile phone noted above. In other words, the user may use the headset to listen to music or other audio that may be stored locally on (and/or accessed remotely by) the laptop and/or mobile phone.

Regardless of whether the headset can connect to both the laptop and the mobile phone at the same time, the two source devices may be configured to manage individual network connections with the headset. In this way, the user may relatively seamlessly use both source devices to play music on the headset (e.g., consecutively switching from one source to the other source). In this example, the source devices may be configured to establish a network socket or other mechanism for streaming data between the two source devices. Once established, the network stream may be utilized by the two source devices to manage the network connections with the user device as if the two source devices were a single device managing a network resource via other network connections.

In some aspects, using the established stream (e.g., a persistent connection, assuming the two source devices stay within a desired distance of each other), the laptop and the mobile phone may be able to provide configuration instructions to one another. This communication between the laptop and the mobile device can be independent of data being communicated between the laptop and the headset and/or between the mobile phone and the headset. For example, if the mobile phone is connected to the headset, the mobile phone may use the established stream (e.g., the network socket) to indicate this connection to the laptop. Alternatively, if the laptop is connected to the headset, the laptop may use the established stream to indicate this connection to the mobile phone.

In this way, the two source devices may be up to date on the current state associated with Bluetooth (or other) connections of the headset. For example, the headset may establish a Bluetooth connection with the laptop and may play music to the user that is provided by the laptop. The information about this connection may be provided by the laptop to the mobile phone via the persistent stream. If the user requests to switch to using the mobile phone for providing the music, the user may simply press a "play" object (e.g., a button) on the mobile phone.

In some aspects, the mobile phone may provide an instruction to the laptop via the stream, e.g., to instruct the laptop to release the headset from its Bluetooth connection. In this way, the headset may now be able to establish a new connection with another device. As desired, the mobile phone may then establish a network connection with the headset and pick up where the laptop left off. In some examples, this may enable the user to seamlessly (or relatively seamlessly) transition from music being played from one device (e.g., at a desk) to the music being played from another device (e.g., while going for a walk), or from music being played on one device to a phone call being answered via the other device.

II. Example System

FIG. 1 illustrates a simplified architecture diagram 100 depicting at least a first computing device 102, a second computing device 104, and at least one user device (or peripheral device) 106. As noted above, the peripheral device 106 may include, but is not limited to, a headset, a pair of headphones, a speaker, a data transferring device, a media player, or the like). In some examples, the peripheral device 106 may be accessible to either or both of the first computing device 102 or the second computing device 104 via one or more networks 108 (e.g., a local area network (LAN), a wide area network (WAN), a personal area network (PAN), or any other wired or wireless network). Based at least in part on the type of network 108 and/or the types of the devices 102, 104, 106, the network connections may be persistent or may be temporal.

In some examples, the first computing device 102 and the second computing device 104 may identify or otherwise request a network socket for establishing a stream of data 110 between the two devices 102, 104. For example, a particular network socket may be used to enable direct streaming of data from the first computing device 102 to the second computing device 104. The streaming can be performed in a persistent manner as long as the two devices 102, 104 remain within a desired physical range of one another. For example, the two devices 102, 104 may stream 110 data through the networks 112, the networks 108, and/or a combination of the two.

In some cases, the networks 108 and 112 may actually be the same network. As noted above, the first computing device 102 and/or the second computing device 104 may be any types of computing devices including, but not limited to, a laptop, a mobile phone, a wearable device (e.g., a smart watch, smart glasses, a smart wristband, or a smart wallet), a tablet, or the like. Further, the first computing device 102 and the second computing device 104 may use the stream 110 to transmit configuration and/or state information about the peripheral device 106. For example, the stream 110 may be used to communicate network connection termination instructions, call answering instructions, call transferring instructions, device pairing and/or connection instructions, or the like.

As noted, in some cases, the peripheral device 106 may be: (1) paired and connected to one device, (2) paired to multiple devices but connected to only one at a time, or (3) paired and connected to one or more devices. The first type listed above, Type 1 peripheral devices (e.g., paired and connected to one device), may only allow pairing to a single device. Pairing the Type 1 peripheral to a new device may cause the peripheral to forget about the previous pairing. For this type of peripheral, switching from a new device to a previously paired device might require a manual re-pairing with the previously paired device. The second type listed above, Type 2 peripheral devices (e.g., paired to multiple devices but connected to only one at a time) may allow pairing to multiple devices; however, they can only connect to one of the paired devices at a time. The third type listed above may divided into two separate types, Type 3 and Type 4 peripheral devices (e.g., paired and connected to one or more devices). Type 3 and Type 4 devices may allow multiple pairings and multiple connections. However, Type 3 devices may experience a multi-second delay when switching the connection between paired devices. On the other hand, Type 4 devices may switch connections between paired devices without any perceivable delay. The first computing device 102 and/or the second computing device 104 may be configured to probe the peripheral device 106 to identify its capabilities. For example, the first computing device may utilize a probing sequence for such a determination, thus enabling faster switching between paired devices (e.g., when it is detected that the peripheral 106 is a Type 4 device). The probing may be performed in advance of any incoming calls. This may allow for faster switching when desired. In other examples, the probing can be performed after the first computing device 102 is paired and connected.

In some cases, if the peripheral 106 is manufactured by the same manufacturer of the first computing device 102 or the second computing device 104, a flag may be included in the peripheral 106 so that if the flag is detected, the probing may not be performed, because the capabilities of the peripheral 106 will be known. Additionally, a device identifier (ID) may be provided, such that the first computing device 102 or the second computing device 104 may look up the capabilities of the peripheral 106 in a table or other data structure. However, as noted above, when the type of the peripheral 106 is not known in advance, the type and/or capabilities of the peripheral 106 may be identified by a probing scheme of two devices. For example, a first device may pair with the peripheral 106. Once paired, the second device may attempt to pair with the peripheral 106. If the pairing between the first device and the peripheral is lost at this point, the two devices may have identified a Type 1 device. Additionally, if the first device remains paired when the second device connects, but the first device cannot also connect while the second device is connected, the two devices may have identified a Type 2 device. Also, the probing scheme may identify a Type 3 or Type 4 device if both devices are capable of being connected to the peripheral 106 at the same time (e.g., at t0 the first device pairs with the peripheral 106, at t1 the second device pairs with the peripheral 106, at t2 the first device connects to the peripheral 106, and at t3 when the second device connects to the peripheral 106, the first device maintains its connection). At least because the two devices are in communication with one another (e.g., via the established stream of data 110), they are able to deduce the type of the peripheral 106 by sharing the results of the probing schemes described above.

In some aspects, the first computing device 102 may be configured to establish a network connection with the peripheral device 106. Once paired and connected, the first computing device 102 may be able to provide content to the peripheral 106 via the established connection. For example, the first computing device 102 may provide music for the peripheral 106 to play or otherwise present to the user. In some examples, if a telephone call arrives at the second computing device 104 while the first connection 114 is being used for playing music, the two devices 102, 104 may determine which of the two devices 102, 104 should provide the call to the peripheral 106. In one example, the call could be routed to the first computing device 102 since it is already paired and connected via the network connection 102. However, the call could stay with the second computing device 104 and be routed to the peripheral 106 via a second network connection 116. In some cases, the determination of which device 102, 104 to use for providing the call to the peripheral 106 (and, thus, receiving the call to be provided) may be made based at least in part on historical user information (e.g., which device 102, 104 the user typically uses for calls), preferences (e.g., which device 102, 104 the user prefers based at least in part on a configuration setting), usage patterns (e.g., which device 102, 104 was the user using last), and/or battery concerns (e.g., which device 102, 104 has more battery life remaining or which device 102, 104 uses less batter power to provide calls).

In some examples, once the determination of which device 102, 104 is to be connected, the two devices 102, 104 may communicate configuration information, instructions for switching devices 102, 104, and/or metadata associated with the currently active network connection 114, 116. For example, if the first computing device 102 is paired and connected to the peripheral 106, but the devices 102, 104 determine that the second computing 104 should provide an incoming phone call (or other content), several instructions may be provided via the stream 110. That is, the second computing device 104 may provide a connection termination instruction to the first computing device 102 via the stream 110. Either before, simultaneously, or sometime after, the second computing device 104 may also begin polling the peripheral device 106 in order to pair. Once, the first computing device 102 has released the first network connection 114, the peripheral device 106 may be able to pair and connect with the second computing device 104 via the second network connection 116. The second computing device 104 may then be able to provide the call to the peripheral device 106.

At an even higher level, the features described herein can enable two devices (e.g., the first computing device 102 and the second computing device 104) that are connected and working together (e.g., in tandem) to share a third device (e.g., the user device 106). In some cases, events may come into either or both of the first computing device 102 or the second computing device 104, and the two devices may be configured to determine which of the two devices 102, 104 should alert the user device 106 of the incoming event (e.g., when both devices 102, 104 receive the same event information). Both devices 102, 104 may be configured to know the state of the other, as well as the state of the user device 106, and may be further configured to command audio (or other event information) routing and policies of the set of devices 102, 104, 106.

III. Example Flow

Figure 2:
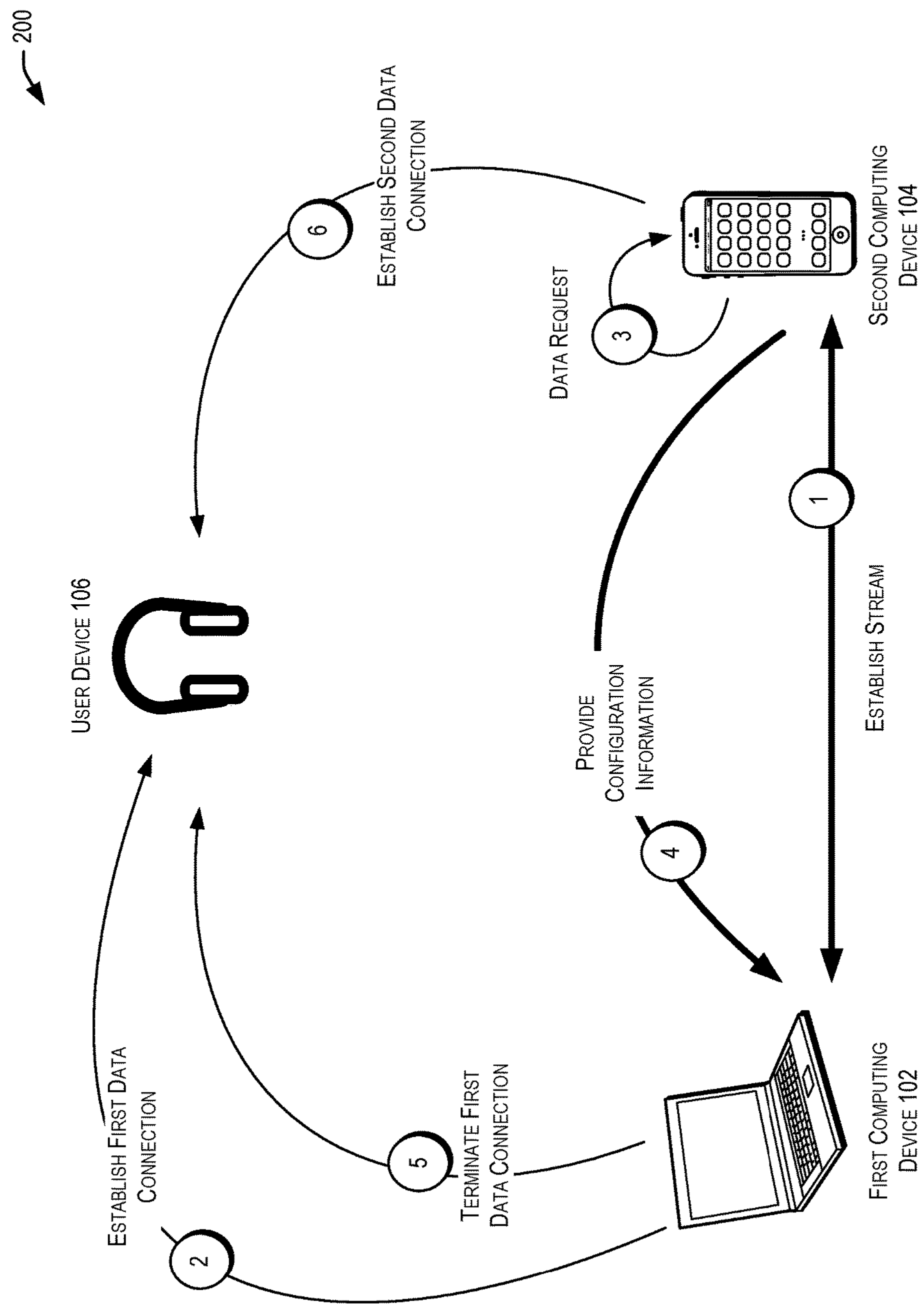
FIG. 2 is another simplified block diagram with connection flows illustrating at least some features of managing connections of a user device as described herein, according to at least one example.

FIG. 2 illustrates a simplified block diagram 200 depicting a connection flow associated with the first computing device 102, the second computing device 104, and the user (or peripheral) device 106 of FIG. 1. In some examples, as noted above, the first computing device 102 and the second computing device 104 may establish a data stream for communicating with one another. The data stream may be initiated, established, and/or maintained by either of the first or second computing devices 102, 104. The data stream may then be used by the two devices 102, 104 to communicate with each other about the state and/or configuration of network connections with the user device 106. For example, the first computing device 102 may communicate any network connections that it has with the user device 106 or with other devices to the second computing device 104 over the data stream.

The first computing device 102 may also be configured to establish a first connection with the user device 106. This first connection may be utilized by the first computing device 102 to provide content to the user device 106. For example, the first computing device 102 may provide an audio track to the user device for presentation to the user. In some examples, the second computing device 104 may receive a data request (e.g., from a user) or other indication that data may be requested to be provided from the second computing device 104 to the user device 106. For example, a telephone call may come into the second computing device 104 while the user is listening to the audio track via the user device 106. Even though the audio track is being provided to the user device 106 by the first computing device 102, the user may wish to answer the call from the second computing device 104. The data request may be the request to answer the call from the second computing device 104 (via the user device 106).

In order to provide the call to the user device 106, the two source devices 102, 104 may first communicate with one another via the data stream to configure the appropriate connections. For example, the second computing device 104 may provide configuration information to the first computing device 102 via the data stream. The configuration information may include instructions for ending the first network connection that is being used by the first computing device 102 to provide the audio track. Based at least in part on this configuration information, the first computing device 102 may then terminate the first data connection so that the second computing device 104 can subsequently establish a second network connection with the user device 106. Once the second network connection is established, the second computing device 104 may be able to provide content (e.g., the call) to the user device 106.

IV. Sequence Diagram

Figure 3:
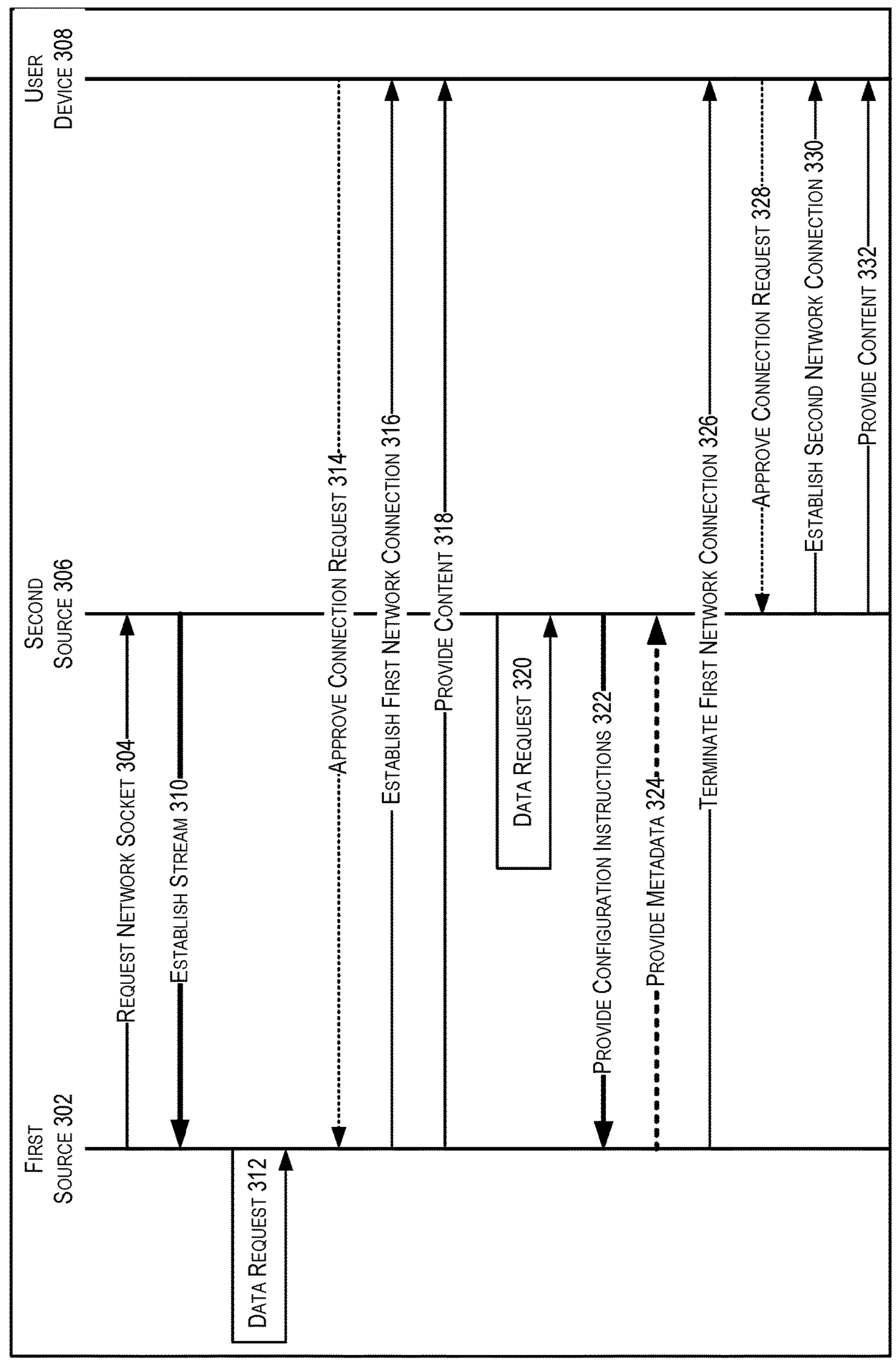
FIG. 3 is a sequence diagram illustrating additional features of managing connections of a user device as described herein, according to at least one example.

FIG. 3 illustrates a simplified network flow diagram 300, for describing at least one use case for the techniques described herein. In some examples, the flow diagram represents requests, application programming interface (API) calls, connections, etc., made by one or more computing devices. In one example, a first source 302 may request a network socket 304 for creating a persistent stream with a second source 306. The first source 302 and the second source 306 may be computing devices configured to manage a shared resource (e.g., a user or peripheral device 308), similar to the first computing device 102 and the second computing device 104 of FIGS. 1 and 2. Additionally, the user device 308 may be configured to provide presentation of content to a user, where the content was provided to the user device 308 from one of the first source 302 or the second source 306. In some examples, the second source 306 may establish the stream 310 with the first source 302. As noted above, this stream may enable the two sources 302, 306 to manage the connections of the user device 308.

The first source 302 may receive a data request 312 (e.g., a request from a user to provide data to the user device 308) or an event (e.g., an indication of incoming call or a calendar appointment). At least in response to a first connection request from the first source 302, the user device 308 may approve the connection request 314 and then the first sources 302 may establish the first network connection 316. The order of these operations may be actually be performed in a variety of different ways (e.g., with or without the initial request for the connection from the first source 302).

Using a Bluetooth network connection, the first source 302 may first attempt to pair with the user device 308 by polling (e.g., sending a request and waiting for a response). In this example, a connection may be established (not necessarily "by" either device) once the user device 308 responds with an acceptance of the request. However, in other examples, the user device 308 may always be pairable with the first source 302, in which case the first source 302 may simply establish a connection with the user device 308 upon completion of the data request 312 or receipt of an event. In some aspects, once the first network connection is established 316, the first source 302 may provide content (e.g., an audio file, portions of an audio file, a telephone call, a notification of an event or calendar appointment, etc.) 318 to the user device 308 via the first network connection 316.

In some cases, the second source 306 may, at some point, receive a second or new data request 320. Similar to the data request 312, the second data request 320 received by the second source 306 may include, but is not limited to, a request from a user to provide content of the second source, an event received by the second source 306, or the like. The second data request 320 may also include a request from a user to switch content sources (e.g., from the first source 302 to the second source 308). That is, the user may navigate to a settings user interface (UI) of the second source 308 (e.g., a network connections control UI) and request that the second source 308 become the source of content for the user device 308. Upon receipt of this data request 320, the second source 306 may be configured to take over control of the user device 308. As such, the second source 306 may provide configuration instructions 322 to the first source 302 using the established stream 310. The configuration instructions may include, among other things, an instruction to release or terminate the first network connection 316, metadata associated with a state of the first network connection 316 and/or the use device 308, instructions for the first source 302 to stop providing content (e.g., pause an audio track), or the like.

In one example, the configuration instructions 322 may instruct the first source to terminate the first connection 316 and provide metadata about the state of the user device 308 and/or the content being provided 318. The first source 302 may provide metadata 324 to the second source (e.g., a location of a song being played by the user device 308) via the stream 310. Based at least in part on the provided instructions 32, the first source 302 may terminate the first network connection 326 with the user device, thus, freeing up the user device 308 for other connections (e.g., a connection with the second source 306). Here, much like the establishment of the first connection, the user device 308 may (or may not need to) approve a connection request 328 from the second source 306. The second source 306 (or the user device 308) may then establish the second network connection 330, and the second source 306 may then provide content 332 to the user device 308 via the second connection 330.

V. Example Method

Figure 4:
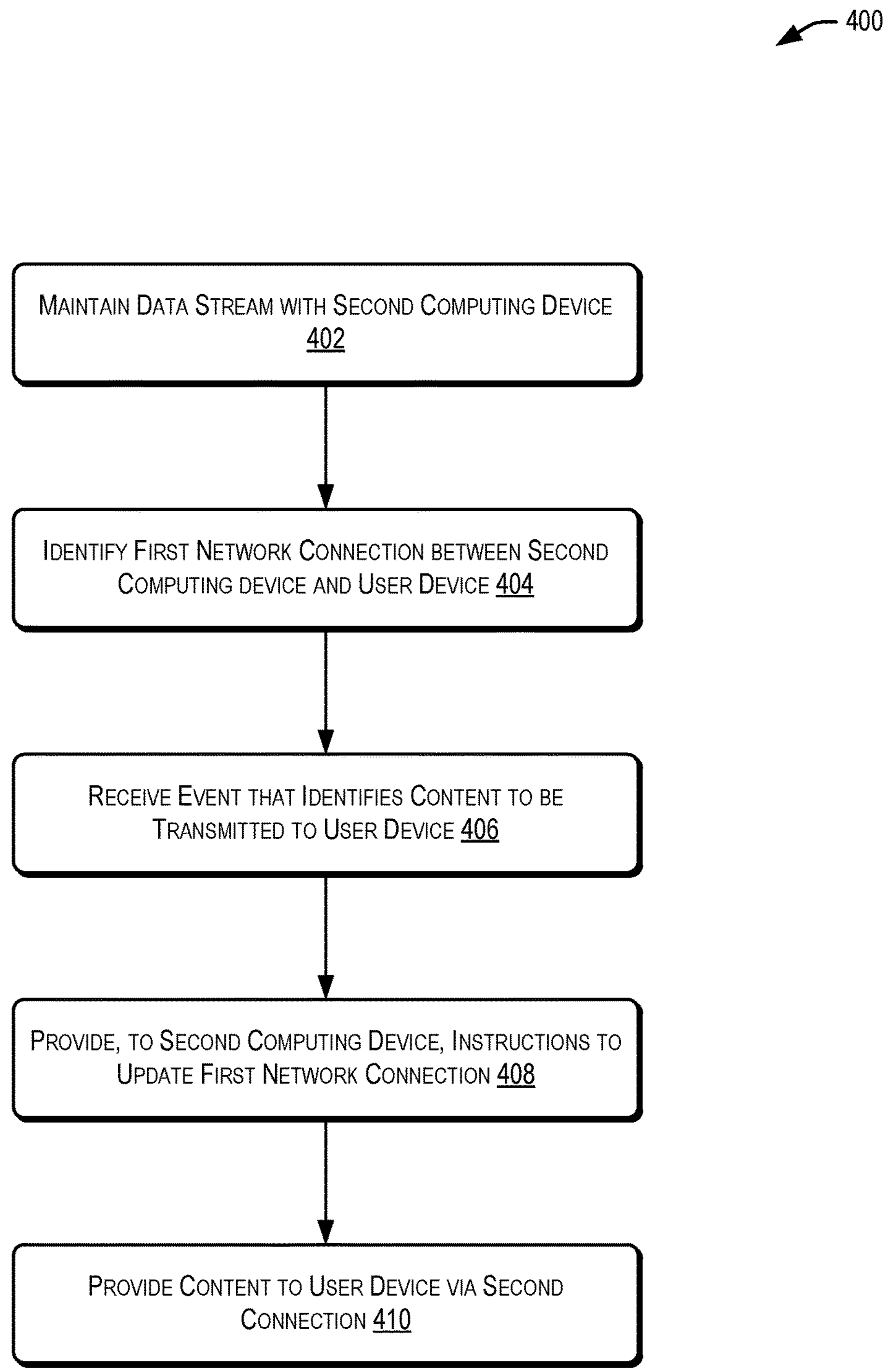
FIG. 4 is a flowchart of a method for managing connections of a user device as described herein, according to at least one example.

FIG. 4 illustrates an example flow diagram showing a process 400 for managing user device connections, according to at least a few embodiments. This process is illustrated as a logical flow diagram, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors. In some examples, the first computing device 102 shown in FIG. 1 may perform the process 400 of FIG. 4. Additionally, the following description is from the perspective of the first device 102 but it is to be understood that the method could be performed by the second device 104 instead, in which case, references to the "second" computing device would refer to either first device 102 or a third device different from either the first or second devices 102, 104.

At block 402, a data stream between a first device a second computing device can be maintained. In some examples, this process may be executed or performed by a mobile phone of the user, while the second computing device with which a stream is being maintained is a different mobile device of the user (e.g., a laptop, tablet, or the like). As noted, the maintained stream may enable the mobile phone and the different mobile device to manage a peripheral device (e.g., a headset or the like) as a shared resource. In some aspects, the different mobile device of the user (e.g., the second computing device in this example) may be a wearable device such as, but not limited to, smart glasses, a smart watch, or the like).

At block 404, a first network connection between the second computing device and the user device can be identified. For example, the wearable device may already be connected to the headset (e.g., streaming music or other content to the headset). As such, at 404, the mobile phone may be made aware of the first connection based at least in part on data shared via the stream that was maintained at 402.

At 406, an event that identifies content to be transmitted to the user device may be received. In some cases, the content may be a telephone call received by either or both of the mobile device or the mobile phone and the event may be a notification that the call is being received. In other scenarios, the content may be a song that the user wishes to play from the mobile phone (e.g., that may not be stored locally on the wearable device) and the event may be a notification of a request to play the song. Additionally, the content may be a calendar appointment and the event may be a signal indicating that the calendar appointment is occurring or will occur soon.

At 408, instructions for configuring the first network connection to the second computing device may be provided. This instruction may be provided via the stream that is maintained at 402. As such, it should be understood that the stream maintained at 402 may be maintained persistently so long as the mobile phone and the wearable device remain within a threshold distance of each other. In some aspects, the instructions for configuring the first network connection may include an instruction to terminate the first network connection or for the wearable device to otherwise release the headset from its connection. The instructions may also include an instruction to provide metadata via the maintained stream. The metadata may identify information about the first network connection including, but not limited to, a track that is playing on the headset, a playing position in the track that is playing on the headset, a volume of the headset, or the like.

At 410, the content may be provided to the user device via a second connection between the mobile phone and the headset. In other words, if the event indicates an incoming call, the instructions of 408 may terminate the connection between the wearable device and the headset, and the mobile phone may then establish the second connection with the headset. The mobile phone may then source or otherwise provide the incoming telephone call to the headset.

In some examples, if the headset is paired and connected to both the mobile phone and the wearable device, and the user is listening to music from either, the mobile phone and/or the wearable device may attempt to determine which device should send an incoming telephone call to the headset. At may be that both the mobile phone and the wearable device are notified when a call comes in. However, it may be desired that only one of the two devices route the call to the headset. As such, in some cases, if both the mobile phone and the wearable device are within range of the other, the phone may cause the headset to ring and the wearable device may suppress the ring.

This direction (e.g., the determination to have the mobile phone provide the ring instead of the wearable device) may be based at least in part on power advantages realized by having the phone route the call. For example, the phone might have more battery power or might use less battery power to route calls. However, in some examples, the two devices may decide to have the wearable device route the call based at least in part on a determination that the wearable device has more remaining battery life, or a higher percentage of total battery life remaining. In other examples, if the wearable device is out of range of the mobile phone and/or is in stand-alone mode (e.g., not paired with the mobile device), the wearable device may route the call to the headset without even notifying the mobile phone. In some cases, the mobile phone may act as the arbitrator for the two devices, making routing decisions for events that are received at both the mobile phone and the wearable device (or other connected peripheral).

Additionally, in some examples, a telephone call may be transferred from the wearable device to the mobile device (e.g., the routing of the call to the headset may be switched from the wearable device to the mobile device) by providing an icon on a user interface (UI) that identifies the connection and/or the wearable device. By sliding the icon, the user may be able to cause the call to be transferred from the wearable device to the mobile phone (but still sent to the headset).

Other use cases include when a user is listening to music on the wearable device and a call comes in, the user may be able to tap an icon on the wearable device and cause the music to pause or duck, thereby allowing the user to hear the incoming call. This may be implemented by having the call sent from the wearable device or from the mobile phone to the headset. In the former scenario, the wearable device would be configured to pause or duck the music temporarily while providing the call. However, I the latter scenario, the mobile phone may be configured to provide an instruction via the stream to the wearable device, instructing the wearable device to pause or duck the music and/or to give up the connection with the headset so that the mobile phone may connect and provide the call.

As noted, using the stream between the mobile phone and the wearable device, or between any two connectible user devices, the two devices may be able to know each other's available audio routes, current audio route, and whether audio is active. Using this information, smart decisions may be made regarding which of the mobile device or wearable device should provide notifications and/or information. For example, if the wearable device is actively playing music on a headset, the system may assume that the user last interacted with the wearable device. In this case, if a call or other notification came in, the system may determine to provide the call or other notification via the wearable device regardless of battery or other optimization concerns.

As noted, using the stream between the mobile phone and the wearable device, or between any two connectible user devices, the two devices may be able to know the active audio routes of each of the two devices with respect to the headset. Using this information, smart decisions may be made regarding which of the mobile device or wearable device should provide notifications and/or information. For example, if the wearable device is actively playing music on the headset, the system may assume that the user last interacted with the wearable device. In this case, if a call or other notification came in, the system may determine to provide the call or other notification via the wearable device regardless of battery or other optimization concerns.

Other data such as, information that identifies interaction with a screen, information that identifies whether a screen is on, or other the like, may be utilized to predict which device (e.g., the wearable device or the mobile phone) the user is actively using. As noted, this information can be used to determine which device should manage the headset. Routing decisions of incoming events may also be determined based at least in part on the type of event it is, whether it has a sound, etc.

Other decisions, as noted, may be based at least in part on power management decisions. In some cases, the power management decisions may be made by an external service. However, the routing decisions of this system may be based at least in part on those power management rules. In one non-limiting example, if a user switches music being played on a headset from a first device to a second device for a particular reason. At some point, the system may automatically revert the connection back to the device with the best power efficiency. In some cases, the switch may only be made automatically when the user stops or pauses playback; however, in other cases it might be done when the connected device appears to be running out of (or low on) power (e.g., once a threshold remaining power level is reached).

VI. Management of Connections

Figure 5:
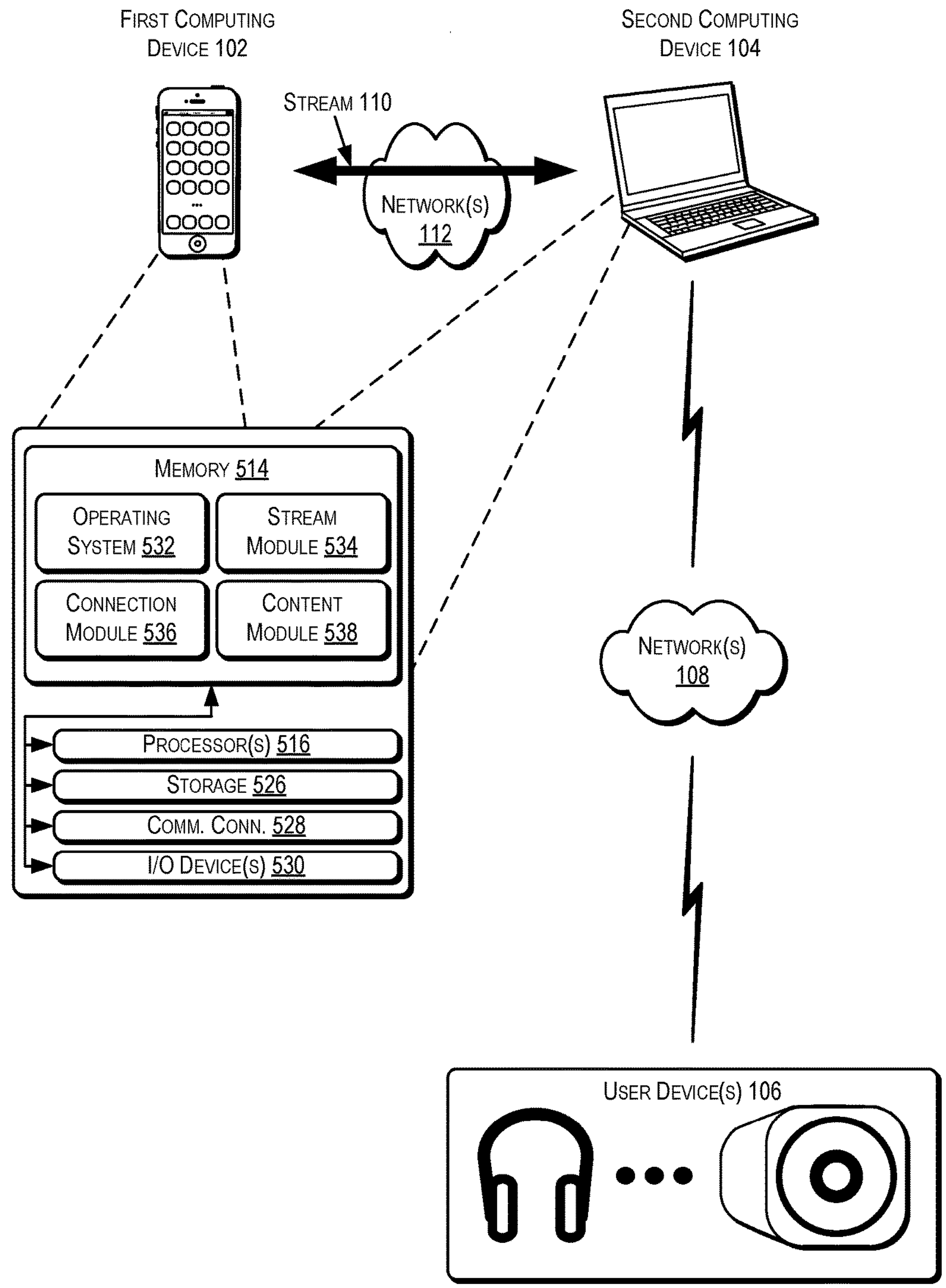
FIG. 5 is a simplified block diagram illustrating another example architecture for managing connections of a user device as described herein, according to at least one example.

FIG. 5 illustrates an example architecture 500 for implementing the management of connections of a user device that includes the first computing device 102 and the second computing device 104, as well as the user device (or peripheral) 106 of FIG. 1. In some examples, as noted above, the devices may be connected via one or more networks 108 and/or 112 (e.g., via Bluetooth, BTLE, or the like). In architecture 500, one or more users may utilize the first computing device 102 and/or the second computing device 104 to manage, control, or otherwise utilize one or more user devices 106, via one or more networks 108.

While the illustrated example represents the computing devices 102, 104 accessing the peripheral device 106 via the networks 108 and/or 112, the described techniques may equally apply in instances where the computing devices 102, 104 interact with the user device 106 over a landline phone, via a kiosk, or in any other manner. It is also noted that the described techniques may apply in other client/server arrangements, as well as in non-client/server arrangements (e.g., locally stored applications, peer to peer configurations, etc.).

As noted above, the first and second computing devices 102, 104 may be configured to receive events, communicate with one another through the stream 110 (e.g., via the networks 112), and manage routing of information between the two devices 102, 104 and the user devices 106. In some examples, the computing devices 102, 104 may be in communication with each other via the networks 112, or via other network connections.

In one illustrative configuration, either or both of the computing devices 102, 104 may include at least one memory 514 and one or more processing units (or processor(s)) 516. The processor(s) 516 may be implemented as appropriate in hardware, software (e.g., computer-executable instructions, firmware, etc.), or combinations thereof. Computer-executable instruction or firmware implementations of the processor(s) 516 may include machine-executable instructions written in any suitable programming language to perform the various functions described. The computing devices 102, 104 may also include geo-location devices (e.g., a global positioning system (GPS) device or the like) for providing and/or recording geographic location information associated with the computing devices 102, 104.

The memory 514 may store program instructions that are loadable and executable on the processor(s) 516, as well as data generated during the execution of these programs. Depending on the configuration and type of mobile device 102, the memory 514 may be volatile (e.g., random access memory (RAM)) and/or non-volatile (e.g., read-only memory (ROM), flash memory, etc.). The mobile device 102 may also include additional removable storage and/or non-removable storage including, but not limited to, magnetic storage, optical disks, etc. The disk drives and their associated non-transitory computer-readable media may provide non-volatile storage of computer-readable instructions, program modules, data structures, and other data for the computing devices. In some implementations, the memory 514 may include multiple different types of memory, such as RAM, static random access memory (SRAM), dynamic random access memory (DRAM), or ROM. While the volatile memory described herein may be referred to as RAM, any volatile memory (e.g., that does not maintain data stored therein once unplugged from a host and/or power) would be appropriate.

The memory 514 and the additional storage 526, both removable and non-removable, are all examples of non-transitory computer-readable storage media. The memory 514 and the additional storage 526 are all examples of non-transitory computer storage media. Additional types of computer storage media that may be present in the computing devices 102, 104 may include, but are not limited to, phase-change RAM (PRAM), SRAM, electrically erasable programmable read-only memory (EEPROM), flash memory, compact disc read-only memory (CD-ROM), digital video disc (DVD), magnetic cassettes or tape, magnetic disk storage, or any other medium that can be used to store the desired information and that can be accessed by the computing devices 102, 104. Combinations of any of the above should also be included within the scope of non-transitory computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The computing devices 102, 104 may also contain communications connection(s) 528 that allow the computing devices 102, 104 to communicate with a data store or another computing device via the networks 108. The computing devices 102, 104 may also include input/output (I/O) device(s) 530, such as a keyboard, a mouse, a pen, a voice input device, a touch input device, a display, speakers, etc.

Turning to the contents of the memory 514 in more detail, the memory 514 may include an operating system 532 and/or one or more application programs or services for implementing the features disclosed herein (e.g., the process 400 of FIG. 4) including a stream module 534, a connection module 536, and/or a content module 538. In some examples, the stream module 534 may be configured to establish and/or manage a stream (e.g., a persistent Bluetooth connection) between the first computing device 102 and the second computing device 104, such as the stream 110 of FIG. 1. The stream 110 may, in some cases, be established via a network socket when the two devices 102, 104 are within a specific range of one another. The specific range may be defined by the type of network socket, connection, and/or protocol used for the stream 110. For example, if Bluetooth has an effective range of four or five meters, then the stream 110 may be persistent as long the first computing device 102 and the second computing device 104 are within four or five meters of each other. However, in other examples, no specific range may be necessary, as the two devices 102, 104 may set up a stream 110 while they are both connected to a single network (e.g., a LAN or the like). Further, in some examples, the stream module 534 may be configured to manage the communications over the stream 110 by the two computing devices 102, 104. These communications may include, but are not limited to, providing state information, connection information (e.g., connections of the user devices 106), and/or any other information that may enable or aid the two computing devices 102, 104 is managing the shared resource and/or routing events, audio, etc., to the user devices 106.

In some examples, the connection module 536 may be configured to manage or otherwise control secondary connections of the computing devices 102, 104. For example, secondary connections may include connections with computing devices other than the first and second computing devices 102, 104. That is, when the first computing device 102 connects with a peripheral device 106, this may be considered a secondary connection for the first computing device 102. Similarly, a secondary connection of the second computing device 104 may include one with the user device 106. Secondary connections (e.g., a first network connection between the first computing device 102 and the user device 106 or a second network connection between the second computing device 104 and the user device 106) may be utilized by the first and second computing devices 102, 104 to provide event information, audio signals, and/or other data to the user devices 106.

In some examples, the secondary connections managed by the connection module 536 may be initiated by the first or second computing devices 102, 104 and/or by the user devices 106. For example, the first computing device 102 may send a request to establish a first network connection with the user device 106 using the connection module 536. It may then wait until it receives a response from the user device 106 (e.g., a handshake to establish a connection), an indication from a user to quit waiting, information from the stream 110 to quit waiting, or a timeout signal (e.g., indicating that the first computing device should not wait any longer). As noted above, the first and second computing devices 102, 104 may communicate via the stream 110 (e.g., utilizing the stream module 534) to provide each other with connection information (e.g., the first computing device 102 may instruct the second computing device 104 to end a connection with the user device 106) for managing the connections of the user device 106.

In some examples, the content module 538 may be configured to store, mange, and/or provide content to the user devices 106 via the secondary connections managed by the connection module 536. For example, the content module 538 may be configured to receive content (e.g., a telephone call, a song, a video, etc.) and provide the content to the user device 106. If the content is a song, the content module 538 may be responsible for storing the song locally, preparing the song for transmission, and then providing the song to the user device via the secondary connection. In other examples, the content may be a call, and the content module 538 may be configured to provide the audio of the call to the user device 106 (e.g., a headset).

VII. Communication Stack on Mobile Device

The communication of data from a device (e.g., the first computing device 102, the second computing device 104, and/or the user devices 106 of FIG. 1) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTUN) controller can coordinate a plurality of virtual connections with various client applications to communicate over a common socket connection with another device (e.g., the first computing device 102 communicating with the second computing device 104).

Figure 6:
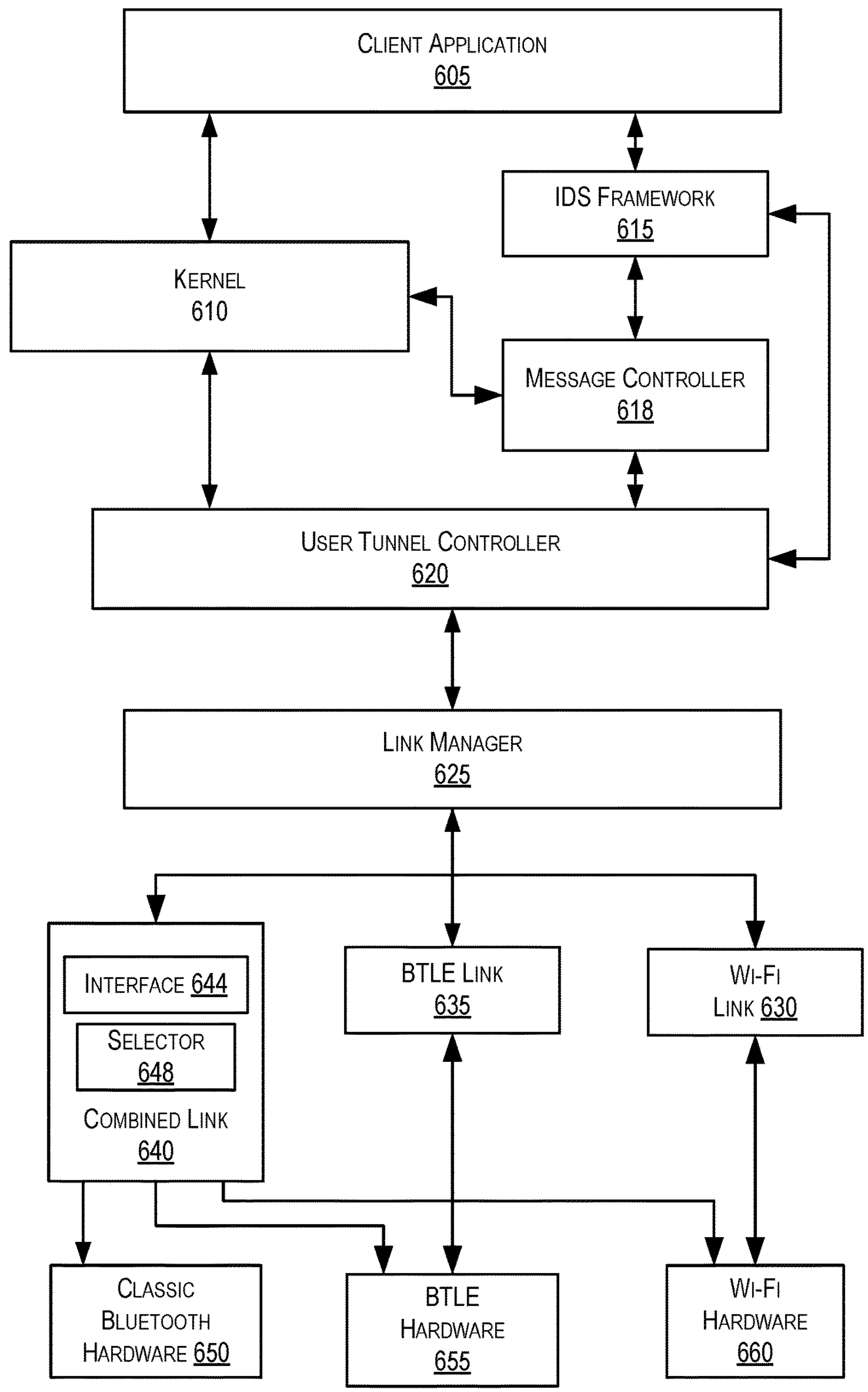
FIG. 6 is a simplified block diagram illustrating at least some features of network connections available for managing connections of a user device as described herein, according to at least one example.

FIG. 6 shows a protocol stack 600 for communicating data according to some examples. Various modules in protocol stack 600 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

In some embodiments, a client application 605 on the device (e.g., mobile device 115) can request data to be sent to another device (e.g., companion device 120). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent any suitable application layer protocol, such as HTTP, RTP, SMTP, MGCP, etc. The other device can be any device, including another device of the user. The request can be made in response to an action by the user, an internal event (e.g., based on time or other criteria) that may be in a same or other application (e.g., a calendar app), or an external event (e.g., in response to a message from another device). An example of an event is a syncing event.

Before sending data, client application 605 can submit an open socket request (e.g., in a streaming example). The socket request can use information from an identity services (IDS) framework 615, which can provide an address (or other type of ID) for the other device. For example, client application 605 can know account information for the second device (e.g., account information of a different or same user), and IDS framework 615 can store a list of device IDs for a particular account. IDS framework 615 can be in communication with identity management infrastructure 105 to obtain the list. Thus, IDS framework 615 can store or otherwise obtain device IDs (e.g., addresses) for all devices that a user has registered with ID infrastructure 105. For example, IDS framework 615 can request via an IDS daemon to ID infrastructure 105 to obtain the device IDs. In one implementation, the socket request can be made to kernel 610.

In a messaging example, the request to send data can go to IDS framework 615 to obtain a device ID, which can be sent to message a message controller 618 and a user tunnel (UTUN controller 620). UTUN controller can establish a mapping between the device ID and an IP address (e.g., a virtual IP address) when the device ID is not an IP address. A socket can be created between message controller 618 (which assigns a device ID to the socket) and kernel 610 (which can assigns an address to the socket, such as a virtual IP address). UTUN controller can be used to create the socket connection between message controller 618 and kernel 610. In this manner, the send-date request from client application 605 does not need to include a device ID, but can specify an account, which can then be cross-referenced by IDS framework 615 with known devices of the account and their capabilities (e.g., if the request requires certain capabilities). Given that a device ID can be obtained, a pairing does not need to occur prior to creating the socket.

In various embodiments, IDS framework 615 can receive a particular port/service at the other device from client application 605, determine the port/service based on information obtained from an ID infrastructure, or determine the port/service from a token sent in the request. IDS framework 615 can then communicate a device ID and other header information to message controller 618 and/or UTUN controller 620. IDS framework 615 and UTUN controller 620 can communicate via cross process communication (XPC). UTUN controller 620 can be part of an IDS daemon, and can receive a device ID from ID infrastructure 105.

As mentioned above, UTUN controller 620 can create a virtual address that corresponds to the actual device address, where the virtual address can be used to create a virtual socket. A virtual socket can also be created using any device ID (e.g., an actual address of a device or other ID). As an example, a socket can be created for communication between client application 605 and kernel 610 (e.g., in a streaming context), where kernel 610 can have various sockets open with various client applications. Kernel 610 can have a single connection to UTUN controller 620 for the other device and multiplex (mux) the data from various client applications into the single connection. Instead or in addition, UTUN controller 620 can also perform the muxing, e.g., if multiple socket exist between kernel 610 and UTUN controller 620 for various client applications to the other device. Incoming data can be demultiplexed (demuxed) for sending to the destination client application.

As another example, a socket can be created between kernel 610 and message controller 618 (e.g., in a messaging context), where a socket can be created for each destination device, with different sockets to a same device potentially having different priorities. Thus, a particular virtual socket can be associated with a particular device and a particular priority (e.g., high and low). Message controller 618 can have various connections to various client applications. Thus, message controller 618 can provide mux/demux capabilities.

UTUN controller can create a primary socket with the other device. When UTUN controller 620 receives data using a virtual connection associated with the second device, it can then map the virtual connection to the primary socket for communicating with the other device. All data for the other device can then be sent out through the primary socket. The virtual address for a virtual socket can be passed back to client application 605, e.g., in the stream context. In one embodiment, a virtual socket involving kernel 610 is a TCP socket. The virtual address can have a same format as a regular address, e.g., an IPv6 address. A mux module can include any combination of kernel 610, message controller 618, and UTUN controller 620.

When client application sends data, client application 605 can use the virtual socket to send data to kernel 610. For example, the data can be sent using TCP via the virtual socket. Kernel 610 can implement an UTUN interface for communicating with UTUN controller 620. Kernel 610 would pass the data (e.g., with a TCP header) and the virtual socket identifying the virtual address to UTUN controller 620, which would then use the virtual address to resolve the device address for determining the device socket.

When sending to the data over the device socket, a link manager 625 can determine which link to use. A link can be a particular combination of a wireless interface protocol (e.g., Bluetooth or Wi-Fi) and a transport protocol (e.g., TCP, UDP, etc.). In this manner, UTUN controller 620 does not need to know how the data is being sent, but instead can simply send the data to link manager 625.

In various embodiments, the determination by link manger 625 can be made per data packet, per set of data packets, per device socket, and may change from one data packet to another. Link manager 625 may then select a link for sending the data. In the example shown, a Wi-Fi link 630 provides software drivers for communicating with one or more Wi-Fi protocols, and BTLE link 635 provides software drivers for communicating with Blutooth LE. Wi-Fi link 630 is in communication with Wi-Fi hardware 660, and BTLE link 635 is in communication with BTLE hardware 655. Wi-Fi link 630 can be used for various Wi-Fi protocols, such as infra-WiFi (infrastructure WiFi). In one embodiment, link manager 625 can try all links to determine whether any of the links can contact the other device, and then use a connected link with a highest predetermined rank or dynamic rank.

In some embodiments, a combined link 640 can include an interface 644 for communicating with link manager 625 and a selector 648 that selects a particular protocol to use. The protocols can be the same or different than that available to link manager 625. Selector 648 can perform similar functions as link manager 625 in that a particular link is selected. However, link manager 625 and selector 648 can use different criteria for determining which link to use. For example, link manager 625 can determine to use combined link 640, and selector 648 can then determine that BTLE hardware 655 is to be used. The hardware can be contained on a same or separate chips.

One or more protocols can be only available via combined link 640, such as classic Bluetooth hardware 650. Link manager 625 and selector 648 can use various criteria for determining which link to use, such as power usage of a link, speed of a link (e.g., real-time data rate), and signal strength of a link. A goal of the optimization for selecting a link can be to provide a minimal data rate at a lowest possible energy.

Illustrative methods and systems for managing user device connections are described above. Some or all of these systems and methods may, but need not, be implemented at least partially by architectures such as those shown at least in FIGS. 1-6 above. In the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User devices (e.g., client devices) can include any type of general purpose personal computer such as, but not limited to, desktop or laptop computers running a standard operating system, as well as cellular, wireless, and/or handheld devices running mobile software and capable of supporting a number of networking and messaging protocols. These devices can also include other electronic devices, such as dummy terminals, thin-clients, gaming systems, or other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers. Alternatively, the memory can be remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as desired.

The system and various devices may also include one or more software applications, modules, services, or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:

managing, by a first device, a first network connection with a second device;

detecting a second network connection between the second device and a peripheral device;

detecting, by the first device, first content provided to the peripheral device by the second device using the second network connection;

receiving, by the first device, an event that identifies second content to be provided to the peripheral device;

at least in response to receipt of the event, determining which of the first device or the second device should provide the second content to the peripheral device; and when it is determined that the second device should provide the second content to the peripheral device:

transmitting, via the first network connection with the second device, at least a portion of the second content; and transmitting, via the first network connection with the second device, an instruction for the second device to transmit the second content to the peripheral device over the second network connection.

2. The method of claim 1, wherein the first network connection between the first device and the second device is configured to be persistent when the first device is within communication range of the second device.

3. The method of claim 1, wherein the second network connection between the second device and the peripheral device comprises a Bluetooth protocol connection.

4. The method of claim 1, wherein the event comprises a notification of an incoming telephone call, a calendar appointment, a request to play a song at the peripheral device, or a message from another device.

5. The method of claim 1, wherein it is determined that the second device should provide the second content to the peripheral device based at least in part on at least one of historical user information associated with the first device and the second device, preference information of a user, usage pattern information, or battery information.

6. A first device, comprising:

a memory configured to store computer-executable instructions; and a first computing device in communication with the memory and configured to execute the computer-executable instructions to:

manage a first network connection with a second device;

detect a second network connection between the second device and a peripheral device;

detect first content provided to the peripheral device by the second device using the second network connection;

receive an event that identifies second content to be provided to the peripheral device;

at least in response to receipt of the event, determine which of the first device or the second device should provide the second content to the peripheral device; and transmit, via the first network connection with the second device, an instruction for the second device to transmit the second content to the peripheral device over the second network connection when it is determined that the second device should provide the second content to the peripheral device.

7. The first device of claim 6, wherein the first network connection between the first device and the second device is configured to be persistent when the first device is within communication range of the second device.

8. The first device of claim 6, wherein the second network connection between the second device and the peripheral device comprises a Bluetooth protocol connection.

9. The first device of claim 6, wherein the event comprises a notification of an incoming telephone call, a calendar appointment, a request to play a song at the peripheral device, or a message from another device.

10. The first device of claim 6, wherein it is determined that the second device should provide the second content to the peripheral device based at least in part on at least one of historical user information associated with the first device and the second device, preference information of a user, usage pattern information, or battery information.

11. The first device of claim 10, wherein the historical user information identifies which of the first device or the second device is used more often for providing the second content.

12. The first device of claim 10, wherein the preference information identifies which of the first device or the second device the user prefers, and wherein the preference information is based at least in part on a configuration setting received from the user.

13. The first device of claim 10, wherein the usage pattern information identifies that the second device was being used last.

14. The first device of claim 10, wherein the battery information identifies that the second device has more battery life remaining or uses less battery power to provide the second content.

15. A non-transitory computer-readable storage medium storing computer-executable instructions that, when executed by a first computing device, configure the first computing device to perform operations comprising:

managing a first network connection with a second computing device;

detecting a second network connection between the second computing device and a peripheral computing device;

detecting first content provided to the peripheral computing device by the second computing device using the second network connection;

receiving an event that identifies second content to be provided to the peripheral computing device;

at least in response to receipt of the event, determining which of the first computing device or the second computing device should provide the second content to the peripheral computing device; and when it is determined that the second computing device should provide the second content to the peripheral computing device transmitting, via the first network connection with the second computing device, an instruction for the second computing device to transmit the second content to the peripheral computing device over the second network connection.

16. The non-transitory computer-readable storage medium of claim 15, wherein the peripheral computing device comprises at least one of a wireless headset or a media player.

17. The non-transitory computer-readable storage medium of claim 15, wherein the event is received by the first computing device and the second computing device.

18. The non-transitory computer-readable storage medium of claim 15, wherein the peripheral computing device is configured to be connectible to only one of the first computing device or the second computing device at a time.

19. The non-transitory computer-readable storage medium of claim 15, wherein the event comprises a notification of an incoming telephone call, a calendar appointment, a request to play a song at the peripheral computing device, or a message from another device.

20. The non-transitory computer-readable storage medium of claim 15, wherein the second content comprises audio of a telephone call, information associated with a calendar appointment, or information associated with a song to be played by the peripheral computing device.

* * * * *